US012035288B2

(12) United States Patent
Abotabl et al.

(10) Patent No.: US 12,035,288 B2
(45) Date of Patent: Jul. 9, 2024

(54) VIRTUAL COMPONENT CARRIERS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 17/444,126

(22) Filed: Jul. 30, 2021

(65) Prior Publication Data

US 2023/0034840 A1 Feb. 2, 2023

(51) Int. Cl.
*H04W 72/04* (2023.01)
*H04W 72/0446* (2023.01)

(52) U.S. Cl.
CPC .............................. *H04W 72/0446* (2013.01)

(58) Field of Classification Search
CPC ................................................ H04W 72/0446
See application file for complete search history.

(56) References Cited

U.S. PATENT DOCUMENTS

| 2015/0098412 | A1* | 4/2015 | Yerramalli | ........ H04W 74/0808 |
| | | | | 370/329 |
| 2017/0295576 | A1 | 10/2017 | Fukuta et al. | |
| 2019/0268938 | A1* | 8/2019 | Zhao | ...................... H04W 74/02 |
| 2020/0112959 | A1 | 4/2020 | Gong et al. | |
| 2022/0376847 | A1* | 11/2022 | He | .......................... H04W 72/23 |
| 2023/0198690 | A1* | 6/2023 | Yang | ..................... H04L 5/0044 |
| | | | | 370/329 |

OTHER PUBLICATIONS

International Search Report and Written Opinion—PCT/US2022/073948—ISA/EPO—dated Oct. 17, 2022.

* cited by examiner

*Primary Examiner* — Melvin C Marcelo
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may receive a slot configuration that indicates a component carrier comprising a plurality of virtual component carriers. The UE may communicate based at least in part on the slot configuration. Numerous other aspects are described.

30 Claims, 8 Drawing Sheets

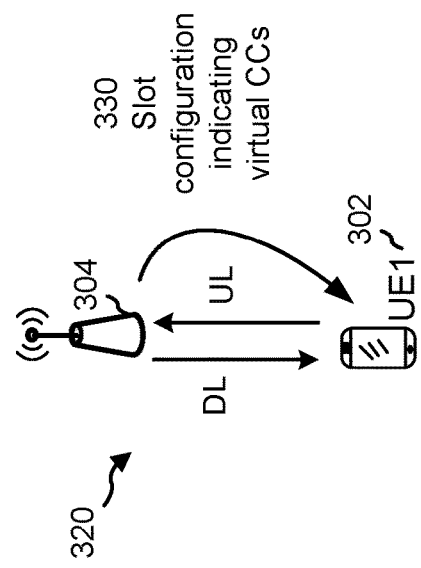
FIG. 3B
FIG. 3C
FIG. 3A

VIRTUAL COMPONENT CARRIERS

FIELD OF THE DISCLOSURE

Aspects of the present disclosure generally relate to wireless communication and to techniques and apparatuses for using virtual component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory. The apparatus may include one or more processors, coupled to the memory, configured, receive a slot configuration that indicates a component carrier comprising a plurality of virtual component carriers. The one or more processors may be configured to communicate based at least in part on the slot configuration.

Some aspects described herein relate to an apparatus for wireless communication at a base station. The apparatus may include a memory. The apparatus may include one or more processors, coupled to the memory, configured, transmit a slot configuration that indicates a component carrier comprising a plurality of virtual component carriers. The one or more processors may be configured to communicate based at least in part on the slot configuration.

Some aspects described herein relate to a method of wireless communication performed by a UE. The method may include receiving a slot configuration that indicates a component carrier comprising a plurality of virtual component carriers. The method may include communicating based at least in part on the slot configuration.

Some aspects described herein relate to a method of wireless communication performed by a base station. The method may include transmitting a slot configuration that indicates a component carrier comprising a plurality of virtual component carriers. The method may include communicating based at least in part on the slot configuration.

Some aspects described herein relate to a UE for wireless communication. The user equipment may include a memory and one or more processors coupled to the memory. The one or more processors may be configured to receive a slot configuration that indicates a component carrier comprising a plurality of virtual component carriers. The one or more processors may be configured to communicate based at least in part on the slot configuration.

Some aspects described herein relate to a base station for wireless communication. The base station may include a memory and one or more processors coupled to the memory. The one or more processors may be configured to transmit a slot configuration that indicates a component carrier comprising a plurality of virtual component carriers. The one or more processors may be configured to communicate based at least in part on the slot configuration.

Some aspects described herein relate to a non-transitory computer-readable medium that stores a set of instructions for wireless communication by a UE. The set of instructions, when executed by one or more processors of the UE, may cause the UE to receive a slot configuration that indicates a component carrier comprising a plurality of virtual component carriers. The set of instructions, when executed by one or more processors of the UE, may cause the UE to communicate based at least in part on the slot configuration.

Some aspects described herein relate to a non-transitory computer-readable medium that stores a set of instructions for wireless communication by a base station. The set of instructions, when executed by one or more processors of the base station, may cause the base station to transmit a slot configuration that indicates a component carrier comprising a plurality of virtual component carriers. The set of instructions, when executed by one or more processors of the base station, may cause the base station to communicate based at least in part on the slot configuration.

Some aspects described herein relate to an apparatus for wireless communication. The apparatus may include means for receiving a slot configuration that indicates a component carrier comprising a plurality of virtual component carriers. The apparatus may include means for communicating based at least in part on the slot configuration.

Some aspects described herein relate to an apparatus for wireless communication. The apparatus may include means for transmitting a slot configuration that indicates a component carrier comprising a plurality of virtual component carriers. The apparatus may include means for communicating based at least in part on the slot configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
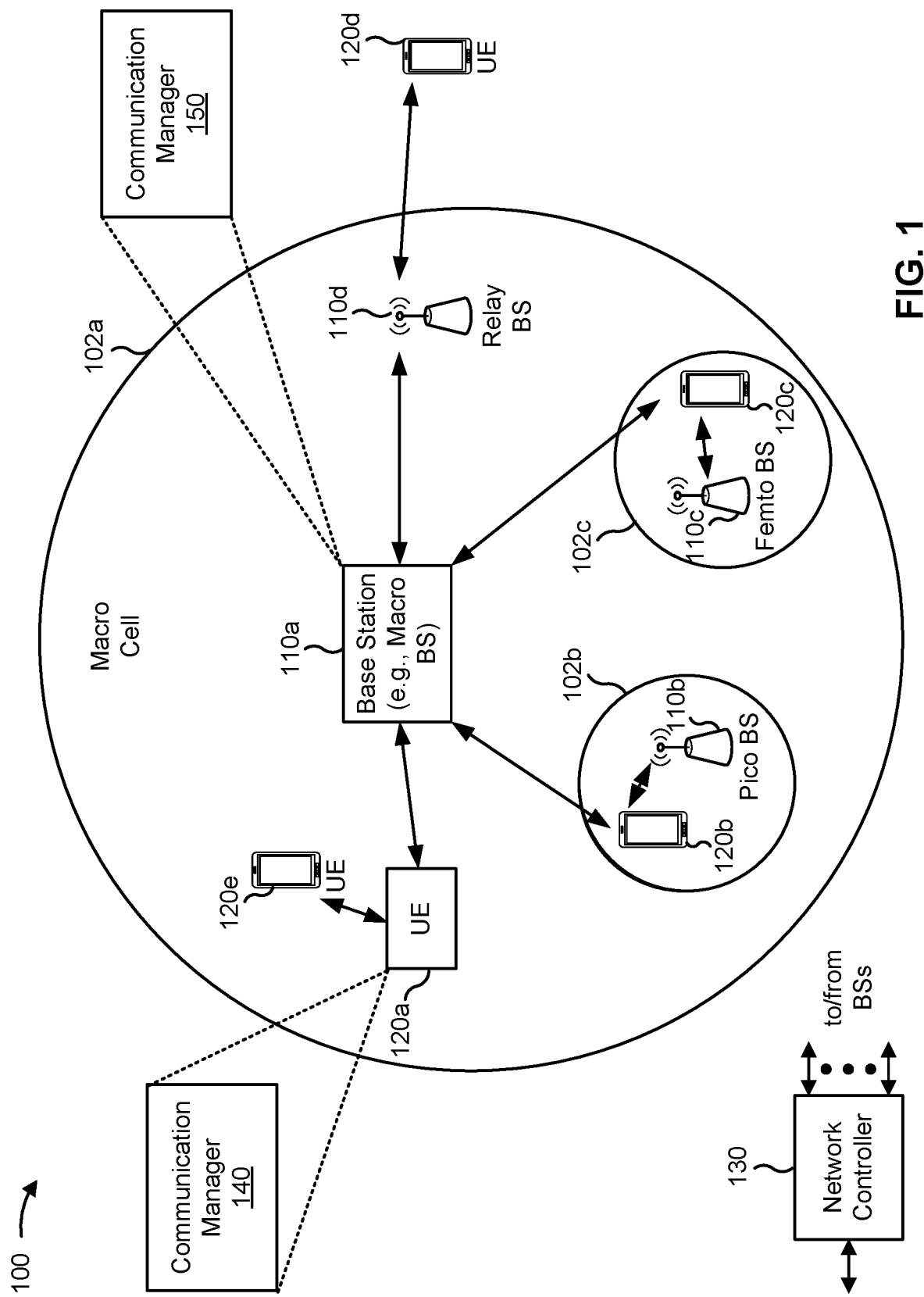
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a slot configuration that indicates a component carrier comprising a plurality of virtual component carriers; and communicate based at least in part on the slot configuration. Additionally, or alternatively, the communication manager 140 may perform one or more other operations described herein.

In some aspects, the base station 110 may include a communication manager 150. As described in more detail elsewhere herein, the communication manager 150 may transmit a slot configuration that indicates a component carrier comprising a plurality of virtual component carriers; and communicate based at least in part on the slot configuration. Additionally, or alternatively, the communication manager 150 may perform one or more other operations described herein.

As indicated above, FIG. 1 is provided as an example. Other examples may differ from what is described with regard to FIG. 1.

Figure 2:
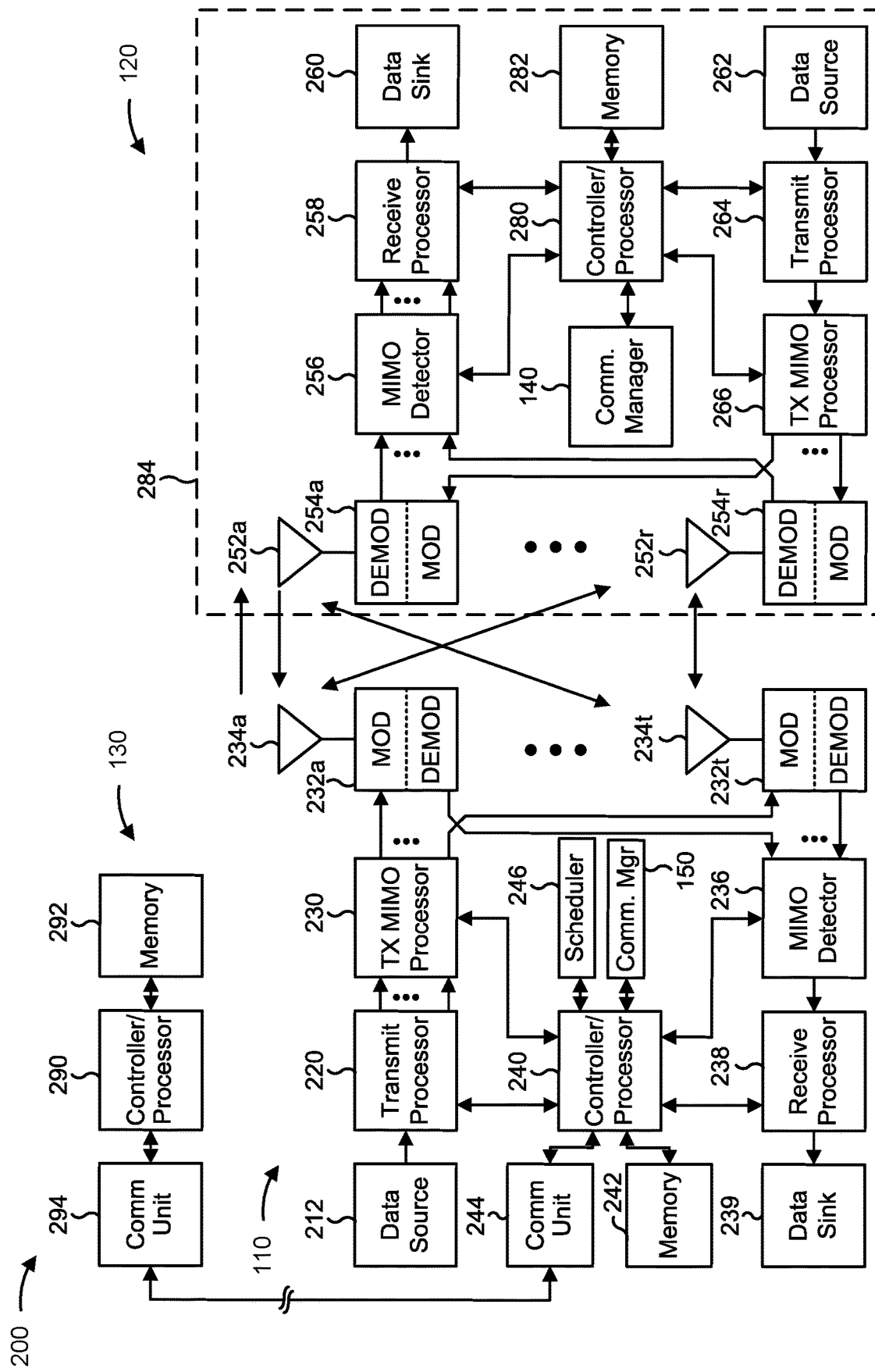
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, controller/processor 280 of the UE 120, and/or any other component(s) of FIG. 2 may perform one or more techniques associated with virtual component carriers, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a slot configuration that indicates a component carrier comprising a plurality of virtual component carriers; and/or means for communicating based at least in part on the slot configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a slot configuration that indicates a component carrier comprising a plurality of virtual component carriers; and/or means for communicating based at least in part on the slot configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex communication in accordance with the present disclosure. The example 300 of FIG. 3A includes a UE1 302 and two base stations (e.g., TRPs) 304-1, 304-2, where the UE1 302 is sending uplink (UL) transmissions to base station 304-1 and is receiving downlink (DL) transmissions from base station 304-2. In the example 300 of FIG. 3A, full-duplex is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting a UL transmission to the base station 304. In the example 310 of FIG. 3B, full-duplex is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting a UL transmission to the base station 304. In the example 320 of FIG. 3C, full-duplex is enabled for both the UE1 302 and the base station 304.

Full-duplex communication provides essentially twice the bandwidth of half-duplex communication by allowing a device to transmit and receive on the same set of resources. However, due to its complications (e.g., self-interference between downlink and uplink transmissions, base-station-to-base-station interference, and UE-to-UE interference) and additional implementation complexity, sub-band full duplex (SBFD) is considered as a first step to realize some of the benefits of full-duplex communications, while circumventing some of its complications. For example, SBFD, with some gaps budgeted across DL and UL resources, can mitigate self-interference, decrease latency, and improve uplink coverage. However, introduction of a full-duplex slot to a wireless communication standard can increase complexity and involve large changes to the standard, which may result in implementation complexity, thereby having a negative impact on network performance.

Some aspects of techniques and apparatuses disclosed herein may facilitate utilizing virtual component carriers to enable full-duplex slots without significant implementation complexity. In some aspects, a component carrier may be divided into multiple virtual component carriers. These virtual component carriers may share a common configuration that is common to the component carrier, while each virtual component carrier may have a specific configuration to facilitate full-duplex operation. For example, as shown by reference number 330, the base station 304 may transmit, and the UE1 302 may receive, a slot configuration that indicates a component carrier comprising a plurality of virtual component carriers. The UE1 302 may communicate (with the base station 304 or with another device) based at least in part on the slot configuration. The virtual component carriers may facilitate providing a full-duplex slot without significant implementation complexity, thereby having a positive impact on network performance.

As indicated above, FIGS. 3A-3C are provided as one or more examples. Other examples may differ from what is described with regard to FIGS. 3A-3C.

Figure 4:
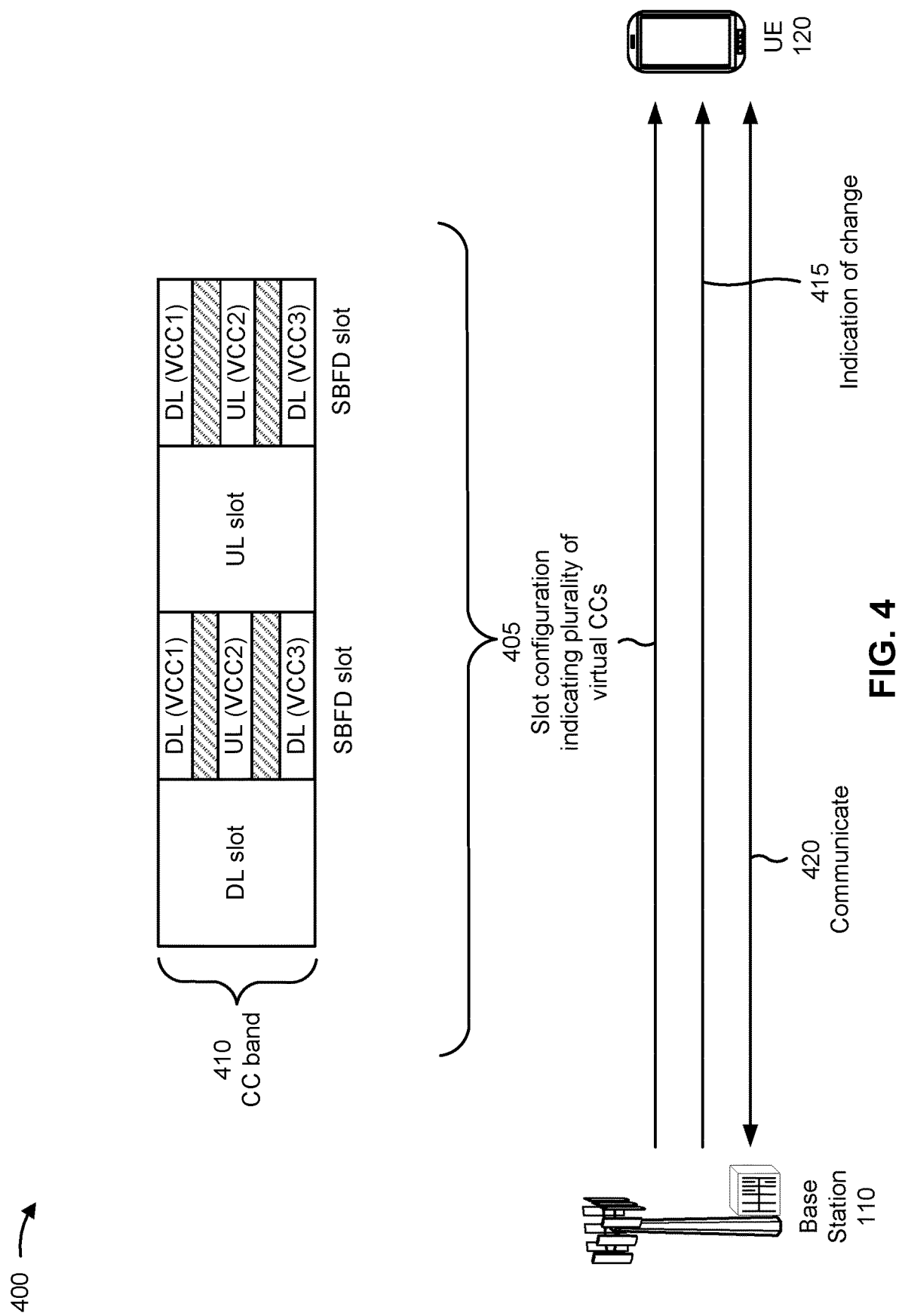
FIG. 4 is a diagram illustrating an example associated with using virtual component carriers, in accordance with the present disclosure.

FIG. 4 is a diagram illustrating an example 400 associated with virtual component carriers, in accordance with the present disclosure. As shown in FIG. 4, a base station 110 and a UE 120 may communicate with one another.

As shown by reference number 405, the base station 110 may transmit, and the UE 120 may receive, a slot configuration that indicates a component carrier comprising a plurality of virtual component carriers (shown as "VCC1," "VCC2," and "VCC3"). Each virtual component carrier of the plurality of virtual component carriers may be contained within a band 410 associated with the component carrier. In some aspects, the base station 110 may transmit, and the UE 120 may receive, the slot configuration via a radio resource control (RRC) message. In some aspects, the slot configuration may indicate at least one additional component carrier comprising at least one additional plurality of virtual component carriers.

In some aspects, virtual component carriers may be contiguous, non-contiguous, or overlapping. For example, the plurality of virtual component carriers may include at least one pair of virtual component carriers that are contiguous in at least one of a time domain or a frequency domain, at least one pair of virtual component carriers that are non-contiguous in at least one of a time domain or a frequency domain, and/or at least one pair of virtual component carriers that are at least partially overlapped in at least one of a time domain or a frequency domain.

As shown, for example, overlapping virtual component carriers may enable full-duplex operation. For example, the second and fourth slots illustrated in FIG. 4 may be designated as SBFD slots since they each include overlapping virtual component carriers. As shown, for example, each SBFD slot includes two DL virtual component carriers (VCC1 and VCC3) and one UL virtual component carrier (VCC2). A virtual component carrier may be defined within full-duplex slots only (e.g., the SBFD slots) or within both full-duplex and half-duplex slots. For example, in FIG. 4, VCC1 and/or VCC3 may be defined within the DL slot and/or VCC2 may be defined within the UL slot. For example, in some aspects, the slot configuration may indicate at least one full-duplex slot associated with at least one virtual component carrier of the plurality of virtual component carriers. In some aspects, the slot configuration may indicate at least one half-duplex slot associated with at least one virtual component carrier of the plurality of virtual component carriers.

In some aspects, the UE 120 may be configured with multiple virtual component carriers, but only a certain set of them may be active. In this way, for example, a full-duplex slot may be used for half-duplex operation. For example, in some aspects, the plurality of virtual component carriers may include a first virtual component carrier (e.g., VCC1) that corresponds to DL communications within a slot, and a second virtual component carrier (e.g., VCC2) that corresponds to UL communications within the slot. The base station 110 may transmit, and the UE 120 may receive, an indication that at least one of the first virtual component carrier or the second virtual component carrier is active. For example, the plurality also may include VCC3 that corresponds to DL communications within the slot. The indication may indicate that VCC1 and VCC3 are active to support half-duplex UL communication in the slot.

For a portion of the component carrier that is not covered by any virtual component carrier, in some aspects, the UE may follow the time domain duplex (TDD) DL and UL (TDD_DL_UL) configuration (which may be referred to as the "slot format") of the component carrier. In some aspects, the UE may assume flexible, DL, or UL direction in this portion. In some aspects, the UE may not make any assumptions regarding the portion of the component carrier that is not covered by a virtual component carrier.

In some aspects, the slot configuration may indicate at least one virtual component carrier group that includes a set of the plurality of virtual component carriers. The slot configuration may indicate a TDD slot configuration corresponding to the at least one virtual component carrier group. The at least one virtual component carrier group may correspond to a communication direction. For example, the slot configuration may indicate a virtual component carrier group that includes VCC1 and VCC3 and is configured for DL communications.

As shown by reference number 415, the base station 110 may transmit, and the UE 120 may receive, an indication of at least one change associated with the at least one virtual component carrier group. For example, the at least one change may be a change in associated communication direction (e.g., DL to UL), a change in the members of the virtual component carrier group, and/or a change in which group of a plurality of virtual component carrier groups is active, among other examples. In some aspects, the indication of the at least one change may be carried in an additional RRC message, a medium access control control element (MAC CE), and/or a downlink control information (DCI) transmission.

As shown by reference number 420, the UE 120 and the base station 110 may communicate with one another based at least in part on the slot configuration or the changed slot configuration, if the slot configuration has been changed, as discussed above. In some aspects, the UE 120 may communicate with another device (e.g., another base station, another UE, or a relay device, among other examples) based at least in part on the slot configuration. For example, the UE 120 may perform full-duplex communication using at least one pair of virtual component carriers having opposite assigned communication directions (e.g., VCC1 and VCC2).

In some aspects, as discussed above, the slot configuration may indicate a portion of the component carrier that does not include a virtual component carrier. In such cases, communicating based at least in part on the slot configuration may include communicating using a slot format of the component carrier for the portion of component carrier that does not include a virtual component carrier. In some aspects, communicating based at least in part on the slot configuration may include communicating using a direction assignment for the portion of the component carrier that does not include a virtual component carrier, where the direction assignment includes a flexible assignment, a reserved assignment, a DL assignment, or a UL assignment.

In some aspects, the slot configuration may indicate at least one of a TDD common slot configuration or a TDD dedicated slot configuration associated with a set of active virtual component carriers of the plurality of virtual component carriers. The slot configuration may indicate at least two overlapped virtual component carriers having opposite direction assignments and, in some aspects, the UE 120 may not be capable of in-band full-duplex communication. In such cases, the UE 120 may communicate based at least in part on the slot configuration by communicating using a slot format of the component carrier.

In some aspects, the slot configuration may indicate at least one configured bandwidth part (BWP) corresponding to at least one virtual component carrier of the plurality of virtual component carriers. The slot configuration may indicate at least one configured BWP corresponding to at least one virtual component carrier group of the plurality of virtual component carriers. The UE 120 may determine a BWP associated with a virtual component carrier based at least in part on at least one of a frequency associated with the virtual component carrier or a BWP associated with the component carrier. In some aspects, the UE 120 may determine, for a communication direction, a BWP associated with a virtual component carrier of the plurality of virtual component carriers based at least in part on an overlap between a BWP associated with the component carrier and a set of virtual component carriers of the plurality of virtual component carriers associated with the communication direction.

As indicated above, FIG. 4 is provided as an example. Other examples may differ from what is described with respect to FIG. 4.

Figure 5:
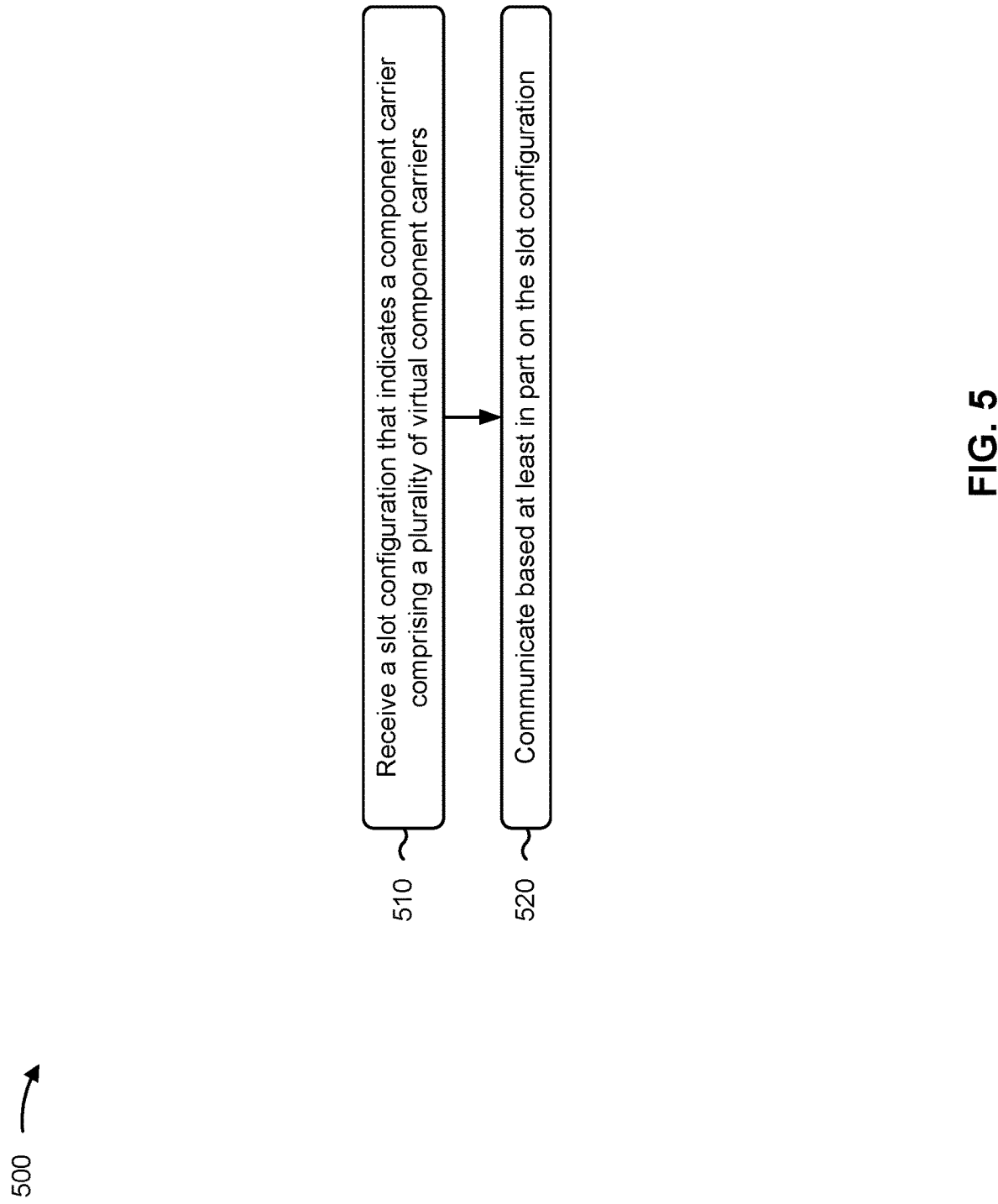
FIGS. 5 and 6 are diagrams illustrating example processes associated with using virtual component carriers, in accordance with the present disclosure.

FIG. 5 is a diagram illustrating an example process 500 performed, for example, by a UE, in accordance with the present disclosure. Example process 500 is an example where the UE (e.g., UE 120) performs operations associated with virtual component carriers.

As shown in FIG. 5, in some aspects, process 500 may include receiving a slot configuration that indicates a component carrier comprising a plurality of virtual component carriers (block 510). For example, the UE (e.g., using communication manager 140 and/or reception component 702, depicted in FIG. 7) may receive a slot configuration that indicates a component carrier comprising a plurality of virtual component carriers, as described above.

As further shown in FIG. 5, in some aspects, process 500 may include communicating based at least in part on the slot configuration (block 520). For example, the UE (e.g., using communication manager 140, the reception component 702, and/or the transmission component 704, depicted in FIG. 7) may communicate based at least in part on the slot configuration, as described above.

Process 500 may include additional aspects, such as any single aspect or any combination of aspects described below and/or in connection with one or more other processes described elsewhere herein.

In a first aspect, the slot configuration indicates at least one additional component carrier comprising at least one additional plurality of virtual component carriers.

In a second aspect, alone or in combination with the first aspect, each virtual component carrier of the plurality of virtual component carriers is contained within a band associated with the component carrier.

In a third aspect, alone or in combination with one or more of the first and second aspects, the plurality of virtual component carriers comprises at least one pair of virtual component carriers that are contiguous in at least one of a time domain or a frequency domain.

In a fourth aspect, alone or in combination with one or more of the first through third aspects, the plurality of virtual component carriers comprises at least one pair of virtual component carriers that are non-contiguous in at least one of a time domain or a frequency domain.

In a fifth aspect, alone or in combination with one or more of the first through fourth aspects, the plurality of virtual component carriers comprises at least one pair of virtual component carriers that are at least partially overlapped in at least one of a time domain or a frequency domain.

In a sixth aspect, alone or in combination with the fifth aspect, communicating based at least in part on the slot configuration comprises performing full-duplex communication using the at least one pair of virtual component carriers.

In a seventh aspect, alone or in combination with one or more of the first through sixth aspects, the slot configuration indicates at least one full-duplex slot associated with at least one virtual component carrier of the plurality of virtual component carriers.

In an eighth aspect, alone or in combination with one or more of the first through seventh aspects, the slot configuration indicates at least one half-duplex slot associated with at least one virtual component carrier of the plurality of virtual component carriers.

In a ninth aspect, alone or in combination with one or more of the first through eighth aspects, the slot configuration indicates a portion of the component carrier that does not include a virtual component carrier.

In a tenth aspect, alone or in combination with the ninth aspect, communicating based at least in part on the slot configuration comprises communicating using a slot format of the component carrier for the portion of the component carrier that does not include a virtual component carrier.

In an eleventh aspect, alone or in combination with the ninth aspect, communicating based at least in part on the slot configuration comprises communicating using a direction assignment for the portion of the component carrier that does not include a virtual component carrier, wherein the direction assignment comprises a flexible assignment, a reserved assignment, a downlink assignment, or an uplink assignment.

In a twelfth aspect, alone or in combination with one or more of the first through eleventh aspects, the plurality of virtual component carriers includes a first virtual component carrier that corresponds to downlink communications within a slot, and a second virtual component carrier that corresponds to uplink communications within the slot.

In a thirteenth aspect, alone or in combination with the twelfth aspect, process 500 includes receiving an indication that at least one of the first virtual component carrier or the second virtual component carrier is active.

In a fourteenth aspect, alone or in combination with one or more of the first through thirteenth aspects, the slot configuration indicates at least one virtual component carrier group that includes a set of the plurality of virtual component carriers.

In a fifteenth aspect, alone or in combination with the fourteenth aspect, the at least one virtual component carrier group corresponds to a communication direction.

In a sixteenth aspect, alone or in combination with one or more of the fourteenth through fifteenth aspects, the slot configuration indicates a time domain duplex slot configuration corresponding to the at least one virtual component carrier group.

In a seventeenth aspect, alone or in combination with one or more of the fourteenth through sixteenth aspects, receiving the slot configuration comprises receiving an RRC message.

In an eighteenth aspect, alone or in combination with the seventeenth aspect, process 500 includes receiving an indication of at least one change associated with the at least one virtual component carrier group, wherein receiving the indication of the at least one change comprises receiving at least one of an additional RRC message, a MAC CE, or a DCI transmission.

In a nineteenth aspect, alone or in combination with one or more of the first through eighteenth aspects, the slot configuration indicates at least one of a time domain duplex common slot configuration or a time domain duplex dedicated slot configuration associated with a set of active virtual component carriers of the plurality of virtual component carriers.

In a twentieth aspect, alone or in combination with one or more of the first through nineteenth aspects, the slot configuration indicates at least two overlapped virtual component carriers having opposite direction assignments, wherein the UE is not capable of in-band full duplex communication, and wherein communicating based at least in part on the slot configuration comprises communicating using a slot format of the component carrier.

In a twenty-first aspect, alone or in combination with one or more of the first through twentieth aspects, the slot configuration indicates at least one configured bandwidth part corresponding to at least one virtual component carrier of the plurality of virtual component carriers.

In a twenty-second aspect, alone or in combination with one or more of the first through twenty-first aspects, the slot configuration indicates at least one configured bandwidth part corresponding to at least one virtual component carrier group of the plurality of virtual component carriers.

In a twenty-third aspect, alone or in combination with one or more of the first through twenty-second aspects, process 500 includes determining a BWP associated with a virtual component carrier of the plurality of virtual component carriers based at least in part on at least one of a frequency associated with the virtual component carrier or a BWP associated with the component carrier.

In a twenty-fourth aspect, alone or in combination with one or more of the first through twenty-third aspects, process 500 includes determining, for a communication direction, a BWP associated with a virtual component carrier of the plurality of virtual component carriers based at least in part on an overlap between a BWP associated with the component carrier and a set of virtual component carriers of the plurality of virtual component carriers associated with the communication direction.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
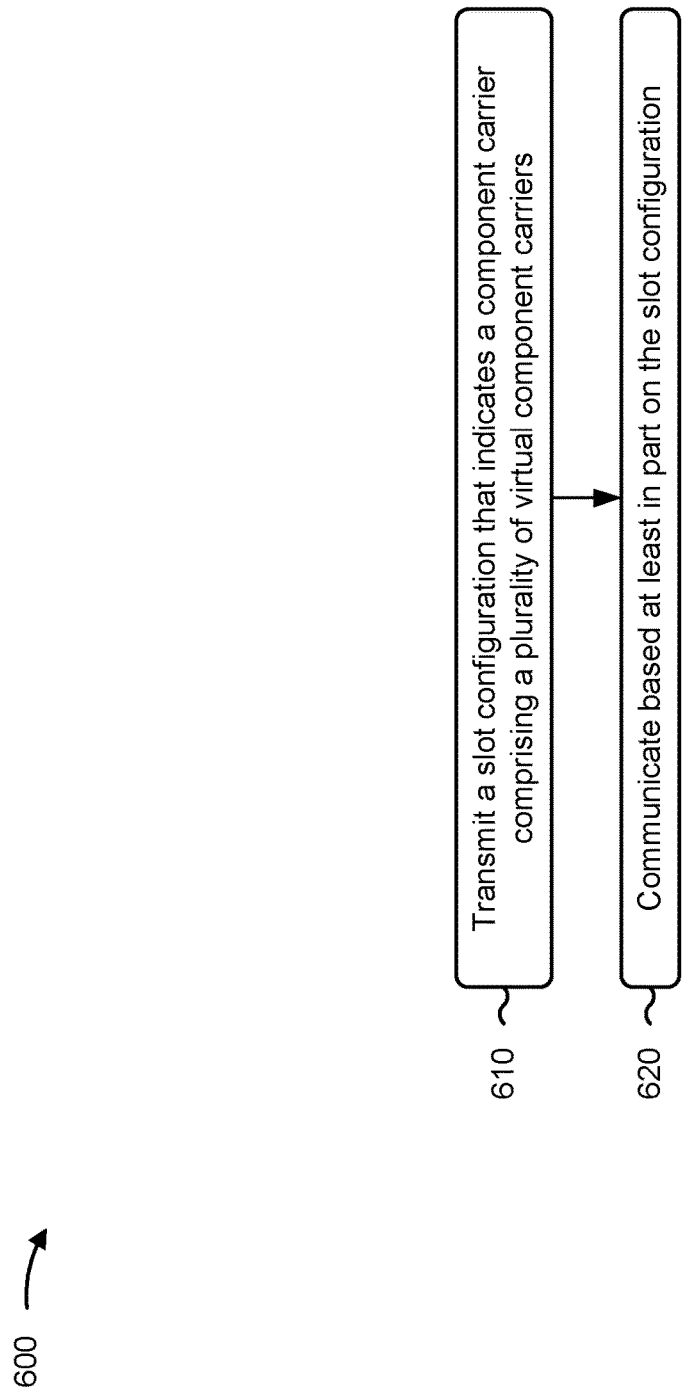

FIG. 6 is a diagram illustrating an example process 600 performed, for example, by a base station, in accordance with the present disclosure. Example process 600 is an example where the base station (e.g., base station 110) performs operations associated with virtual component carriers.

As shown in FIG. 6, in some aspects, process 600 may include transmitting a slot configuration that indicates a component carrier comprising a plurality of virtual component carriers (block 610). For example, the base station (e.g., using communication manager 150 and/or transmission component 804, depicted in FIG. 8) may transmit a slot configuration that indicates a component carrier comprising a plurality of virtual component carriers, as described above.

As further shown in FIG. 6, in some aspects, process 600 may include communicating based at least in part on the slot configuration (block 620). For example, the base station (e.g., using communication manager 150, reception component 802, and/or transmission component 804, depicted in FIG. 8) may communicate based at least in part on the slot configuration, as described above.

Process 600 may include additional aspects, such as any single aspect or any combination of aspects described below and/or in connection with one or more other processes described elsewhere herein.

In a first aspect, the slot configuration indicates at least one additional component carrier comprising at least one additional plurality of virtual component carriers.

In a second aspect, alone or in combination with the first aspect, each virtual component carrier of the plurality of virtual component carriers is contained within a band associated with the component carrier.

In a third aspect, alone or in combination with one or more of the first and second aspects, the plurality of virtual component carriers comprises at least one pair of virtual component carriers that are contiguous in at least one of a time domain or a frequency domain.

In a fourth aspect, alone or in combination with one or more of the first through third aspects, the plurality of virtual component carriers comprises at least one pair of virtual component carriers that are non-contiguous in at least one of a time domain or a frequency domain.

In a fifth aspect, alone or in combination with one or more of the first through fourth aspects, the plurality of virtual component carriers comprises at least one pair of virtual component carriers that are at least partially overlapped in at least one of a time domain or a frequency domain.

In a sixth aspect, alone or in combination with the fifth aspect, the at least one pair of virtual component carriers is configured to facilitate full-duplex communication.

In a seventh aspect, alone or in combination with one or more of the first through sixth aspects, the slot configuration indicates at least one full-duplex slot associated with at least one virtual component carrier of the plurality of virtual component carriers.

In an eighth aspect, alone or in combination with one or more of the first through seventh aspects, the slot configuration indicates at least one half-duplex slot associated with at least one virtual component carrier of the plurality of virtual component carriers.

In a ninth aspect, alone or in combination with one or more of the first through eighth aspects, the plurality of virtual component carriers includes a first virtual component carrier that corresponds to downlink communications within a slot, and a second virtual component carrier that corresponds to uplink communications within the slot.

In a tenth aspect, alone or in combination with the ninth aspect, process 600 includes transmitting an indication that at least one of the first virtual component carrier or the second virtual component carrier is active.

In an eleventh aspect, alone or in combination with one or more of the first through tenth aspects, the slot configuration indicates at least one virtual component carrier group that includes a set of the plurality of virtual component carriers.

In a twelfth aspect, alone or in combination with the eleventh aspect, the at least one virtual component carrier group corresponds to a communication direction.

In a thirteenth aspect, alone or in combination with one or more of the eleventh through twelfth aspects, the slot configuration indicates a time domain duplex slot configuration corresponding to the at least one virtual component carrier group.

In a fourteenth aspect, alone or in combination with one or more of the eleventh through thirteenth aspects, transmitting the slot configuration comprises transmitting an RRC message.

In a fifteenth aspect, alone or in combination with the fourteenth aspect, process 600 includes transmitting an indication of at least one change associated with the at least one virtual component carrier group, wherein transmitting the indication of the at least one change comprises transmitting at least one of an additional RRC message, a MAC CE, or a DCI transmission.

In a sixteenth aspect, alone or in combination with one or more of the first through fifteenth aspects, the slot configuration indicates at least one of a time domain duplex common slot configuration or a time domain duplex dedicated slot configuration associated with a set of active virtual component carriers of the plurality of virtual component carriers.

In a seventeenth aspect, alone or in combination with one or more of the first through sixteenth aspects, the slot configuration indicates at least one configured bandwidth part corresponding to at least one virtual component carrier of the plurality of virtual component carriers.

In an eighteenth aspect, alone or in combination with one or more of the first through seventeenth aspects, the slot configuration indicates at least one configured bandwidth part corresponding to at least one virtual component carrier group of the plurality of virtual component carriers.

In a nineteenth aspect, alone or in combination with one or more of the first through eighteenth aspects, a BWP associated with a virtual component carrier of the plurality of virtual component carriers is based at least in part on at least one of a frequency associated with the virtual component carrier or a BWP associated with the component carrier.

In a twentieth aspect, alone or in combination with one or more of the first through nineteenth aspects, for a communication direction, a BWP associated with a virtual component carrier of the plurality of virtual component carriers is based at least in part on an overlap between a BWP associated with the component carrier and a set of virtual component carriers of the plurality of virtual component carriers associated with the communication direction.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
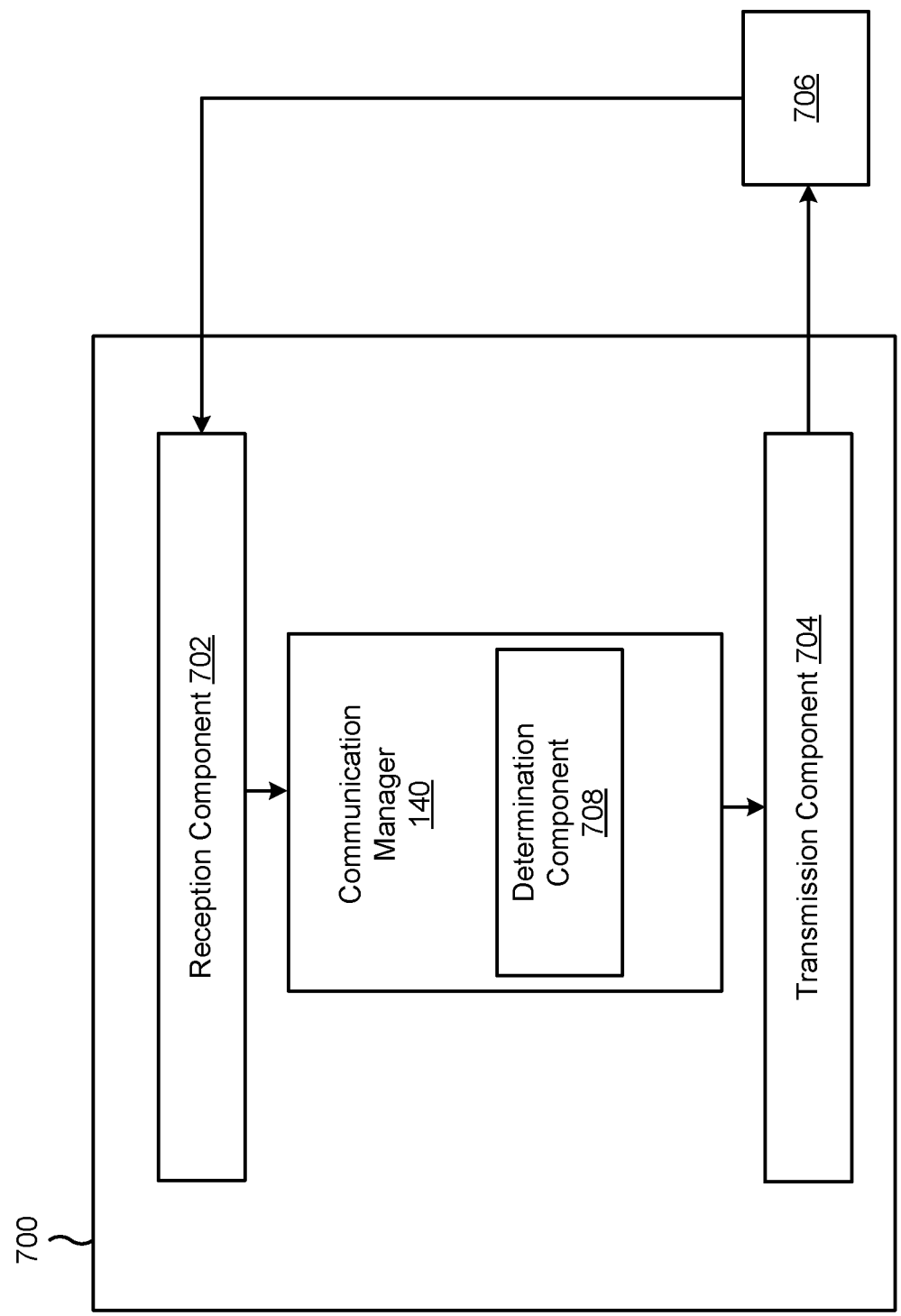
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a determination component 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a slot configuration that indicates a component carrier comprising a plurality of virtual component carriers. The communication manager 140, the reception component 702, and/or the transmission component 704 may communicate based at least in part on the slot configuration. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 702 and/or the transmission component 704.

The reception component 702 may receive an indication that at least one of the first virtual component carrier or the second virtual component carrier is active.

The reception component 702 may receive an indication of at least one change associated with the at least one virtual component carrier group, wherein receiving the indication of the at least one change comprises receiving at least one of an additional RRC message, a MAC CE, or a DCI transmission.

The determination component 708 may determine a BWP associated with a virtual component carrier of the plurality of virtual component carriers based at least in part on at least one of a frequency associated with the virtual component carrier or a BWP associated with the component carrier. The determination component 708 may determine, for a communication direction, a BWP associated with a virtual component carrier of the plurality of virtual component carriers based at least in part on an overlap between a BWP associated with the component carrier and a set of virtual component carriers of the plurality of virtual component carriers associated with the communication direction. In some aspects, the determination component 708 may include one or more antennas, a modem, a modulator, a transmit MIMO processor, a transmit processor, a controller/processor, a memory, or a combination thereof, of the UE described in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
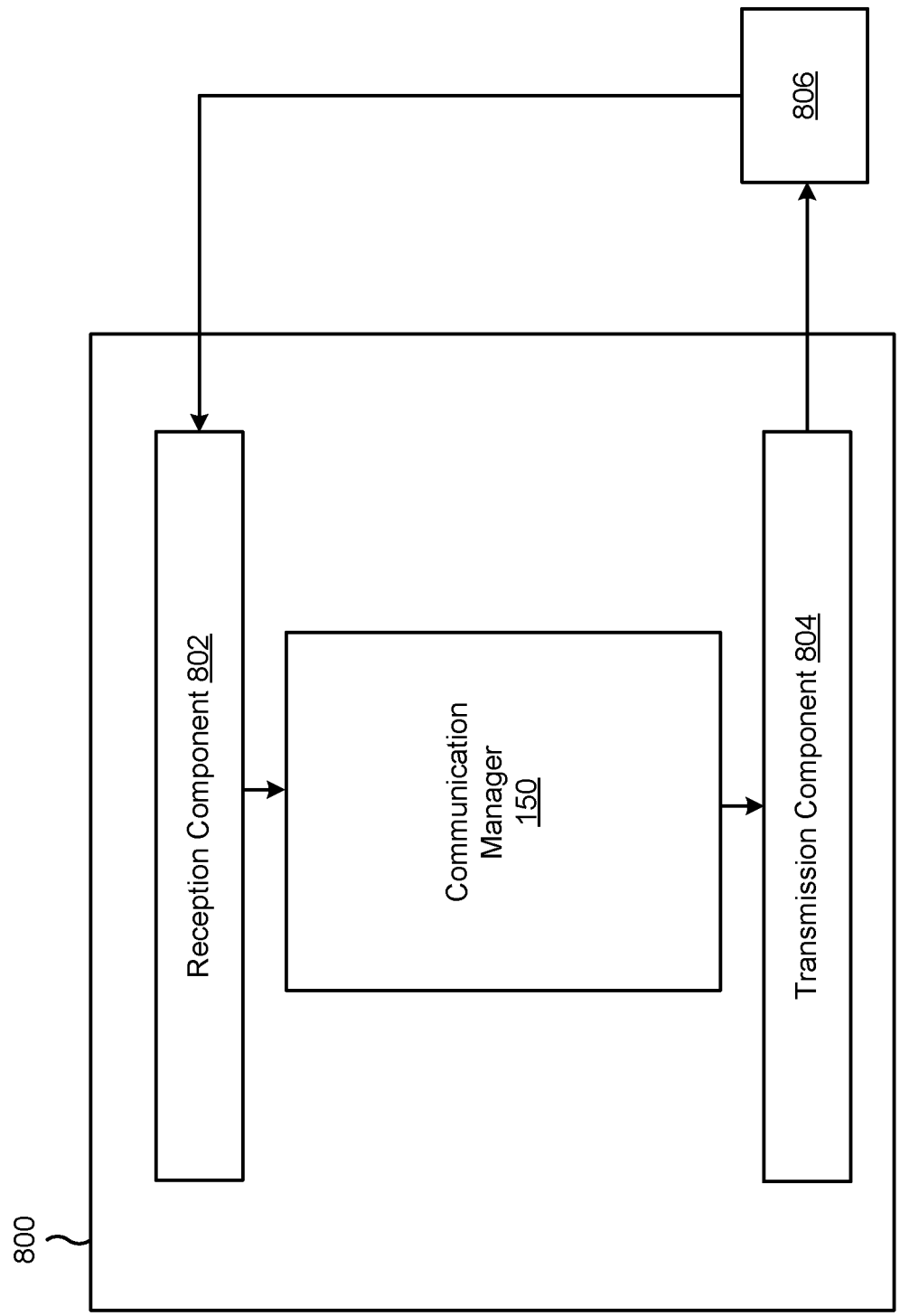

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a slot configuration that indicates a component carrier comprising a plurality of virtual component carriers. The reception component 802 and/or the transmission component 804 may communicate based at least in part on the slot configuration.

The transmission component 804 may transmit an indication that at least one of the first virtual component carrier or the second virtual component carrier is active.

The transmission component 804 may transmit an indication of at least one change associated with the at least one virtual component carrier group, wherein transmitting the indication of the at least one change comprises transmitting at least one of an additional RRC message, a MAC CE, or a DCI transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a slot configuration that indicates a component carrier comprising a plurality of virtual component carriers; and communicating based at least in part on the slot configuration.

Aspect 2: The method of Aspect 1, wherein the slot configuration indicates at least one additional component carrier comprising at least one additional plurality of virtual component carriers.

Aspect 3: The method of either of Aspects 1 or 2, wherein each virtual component carrier of the plurality of virtual component carriers is contained within a band associated with the component carrier.

Aspect 4: The method of any of Aspects 1-3, wherein the plurality of virtual component carriers comprises at least one pair of virtual component carriers that are contiguous in at least one of a time domain or a frequency domain.

Aspect 5: The method of any of Aspects 1-4, wherein the plurality of virtual component carriers comprises at least one pair of virtual component carriers that are non-contiguous in at least one of a time domain or a frequency domain.

Aspect 6: The method of any of Aspects 1-5, wherein the plurality of virtual component carriers comprises at least one pair of virtual component carriers that are at least partially overlapped in at least one of a time domain or a frequency domain.

Aspect 7: The method of Aspect 6, wherein communicating based at least in part on the slot configuration comprises performing full-duplex communication using the at least one pair of virtual component carriers.

Aspect 8: The method of any of Aspects 1-7, wherein the slot configuration indicates at least one full-duplex slot associated with at least one virtual component carrier of the plurality of virtual component carriers.

Aspect 9: The method of any of Aspects 1-8, wherein the slot configuration indicates at least one half-duplex slot associated with at least one virtual component carrier of the plurality of virtual component carriers.

Aspect 10: The method of any of Aspects 1-9, wherein the slot configuration indicates a portion of the component carrier that does not include a virtual component carrier.

Aspect 11: The method of Aspect 10, wherein communicating based at least in part on the slot configuration comprises communicating using a slot format of the component carrier for the portion of the component carrier that does not include a virtual component carrier.

Aspect 12: The method of Aspect 10, wherein communicating based at least in part on the slot configuration comprises communicating using a direction assignment for the portion of the component carrier that does not include a virtual component carrier, wherein the direction assignment comprises a flexible assignment, a reserved assignment, a downlink assignment, or an uplink assignment.

Aspect 13: The method of any of Aspects 1-12, wherein the plurality of virtual component carriers includes: a first virtual component carrier that corresponds to downlink communications within a slot, and a second virtual component carrier that corresponds to uplink communications within the slot.

Aspect 14: The method of Aspect 13, further comprising receiving an indication that at least one of the first virtual component carrier or the second virtual component carrier is active.

Aspect 15: The method of any of Aspects 1-14, wherein the slot configuration indicates at least one virtual component carrier group that includes a set of the plurality of virtual component carriers.

Aspect 16: The method of Aspect 15, wherein the at least one virtual component carrier group corresponds to a communication direction.

Aspect 17: The method of either of Aspects 15 or 16, wherein the slot configuration indicates a time domain duplex slot configuration corresponding to the at least one virtual component carrier group.

Aspect 18: The method of any of Aspects 15-17, wherein receiving the slot configuration comprises receiving a radio resource control (RRC) message.

Aspect 19: The method of Aspect 18, further comprising receiving an indication of at least one change associated with the at least one virtual component carrier group, wherein receiving the indication of the at least one change comprises receiving at least one of: an additional RRC message, a medium access control control element, or a downlink control information transmission.

Aspect 20: The method of any of Aspects 1-19, wherein the slot configuration indicates at least one of a time domain duplex common slot configuration or a time domain duplex dedicated slot configuration associated with a set of active virtual component carriers of the plurality of virtual component carriers.

Aspect 21: The method of any of Aspects 1-20, wherein the slot configuration indicates at least two overlapped virtual component carriers having opposite direction assignments, wherein the UE is not capable of in-band full duplex communication, and wherein communicating based at least in part on the slot configuration comprises communicating using a slot format of the component carrier.

Aspect 22: The method of any of Aspects 1-21, wherein the slot configuration indicates at least one configured bandwidth part corresponding to at least one virtual component carrier of the plurality of virtual component carriers.

Aspect 23: The method of any of Aspects 1-22, wherein the slot configuration indicates at least one configured bandwidth part corresponding to at least one virtual component carrier group of the plurality of virtual component carriers.

Aspect 24: The method of any of Aspects 1-23, further comprising determining a bandwidth part (BWP) associated with a virtual component carrier of the plurality of virtual component carriers based at least in part on at least one of a frequency associated with the virtual component carrier or a BWP associated with the component carrier.

Aspect 25: The method of any of Aspects 1-24, further comprising determining, for a communication direction, a bandwidth part (BWP) associated with a virtual component carrier of the plurality of virtual component carriers based at least in part on an overlap between a BWP associated with the component carrier and a set of virtual component carriers of the plurality of virtual component carriers associated with the communication direction.

Aspect 26: A method of wireless communication performed by a base station, comprising: transmitting a slot configuration that indicates a component carrier comprising a plurality of virtual component carriers; and communicating based at least in part on the slot configuration.

Aspect 27: The method of Aspect 26, wherein the slot configuration indicates at least one additional component carrier comprising at least one additional plurality of virtual component carriers.

Aspect 28: The method of either of Aspects 26 or 27, wherein each virtual component carrier of the plurality of virtual component carriers is contained within a band associated with the component carrier.

Aspect 29: The method of any of Aspects 26-28, wherein the plurality of virtual component carriers comprises at least one pair of virtual component carriers that are contiguous in at least one of a time domain or a frequency domain.

Aspect 30: The method of any of Aspects 26-29, wherein the plurality of virtual component carriers comprises at least one pair of virtual component carriers that are non-contiguous in at least one of a time domain or a frequency domain.

Aspect 31: The method of any of Aspects 26-30, wherein the plurality of virtual component carriers comprises at least one pair of virtual component carriers that are at least partially overlapped in at least one of a time domain or a frequency domain.

Aspect 32: The method of Aspect 31, wherein the at least one pair of virtual component carriers is configured to facilitate full-duplex communication.

Aspect 33: The method of any of Aspects 26-32, wherein the slot configuration indicates at least one full-duplex slot associated with at least one virtual component carrier of the plurality of virtual component carriers.

Aspect 34: The method of any of Aspects 26-33, wherein the slot configuration indicates at least one half-duplex slot associated with at least one virtual component carrier of the plurality of virtual component carriers.

Aspect 35: The method of any of Aspects 26-34, wherein the plurality of virtual component carriers includes: a first virtual component carrier that corresponds to downlink communications within a slot, and a second virtual component carrier that corresponds to uplink communications within the slot.

Aspect 36: The method of Aspect 35, further comprising transmitting an indication that at least one of the first virtual component carrier or the second virtual component carrier is active.

Aspect 37: The method of any of Aspects 26-36, wherein the slot configuration indicates at least one virtual component carrier group that includes a set of the plurality of virtual component carriers.

Aspect 38: The method of Aspect 37, wherein the at least one virtual component carrier group corresponds to a communication direction.

Aspect 39: The method of either of Aspects 37 or 38, wherein the slot configuration indicates a time domain duplex slot configuration corresponding to the at least one virtual component carrier group.

Aspect 40: The method of any of Aspects 37-39, wherein transmitting the slot configuration comprises transmitting a radio resource control (RRC) message.

Aspect 41: The method of Aspect 40, further comprising transmitting an indication of at least one change associated with the at least one virtual component carrier group, wherein transmitting the indication of the at least one change comprises transmitting at least one of: an additional RRC message, a medium access control control element, or a downlink control information transmission.

Aspect 42: The method of any of Aspects 26-41, wherein the slot configuration indicates at least one of a time domain duplex common slot configuration or a time domain duplex dedicated slot configuration associated with a set of active virtual component carriers of the plurality of virtual component carriers.

Aspect 43: The method of any of Aspects 26-42, wherein the slot configuration indicates at least one configured bandwidth part corresponding to at least one virtual component carrier of the plurality of virtual component carriers.

Aspect 44: The method of any of Aspects 26-43, wherein the slot configuration indicates at least one configured bandwidth part corresponding to at least one virtual component carrier group of the plurality of virtual component carriers.

Aspect 45: The method of any of Aspects 26-44, wherein a bandwidth part (BWP) associated with a virtual component carrier of the plurality of virtual component carriers is based at least in part on at least one of a frequency associated with the virtual component carrier or a BWP associated with the component carrier.

Aspect 46: The method of any of Aspects 26-45, wherein, for a communication direction, a bandwidth part (BWP) associated with a virtual component carrier of the plurality of virtual component carriers is based at least in part on an overlap between a BWP associated with the component carrier and a set of virtual component carriers of the plurality of virtual component carriers associated with the communication direction.

Aspect 47: An apparatus for wireless communication at a device, comprising a processor; memory coupled with the processor; and instructions stored in the memory and executable by the processor to cause the apparatus to perform the method of one or more of Aspects 1-25.

Aspect 48: A device for wireless communication, comprising a memory and one or more processors coupled to the memory, the one or more processors configured to perform the method of one or more of Aspects 1-25.

Aspect 49: An apparatus for wireless communication, comprising at least one means for performing the method of one or more of Aspects 1-25.

Aspect 50: A non-transitory computer-readable medium storing code for wireless communication, the code comprising instructions executable by a processor to perform the method of one or more of Aspects 1-25.

Aspect 51: A non-transitory computer-readable medium storing a set of instructions for wireless communication, the set of instructions comprising one or more instructions that, when executed by one or more processors of a device, cause the device to perform the method of one or more of Aspects 1-25.

Aspect 52: An apparatus for wireless communication at a device, comprising a processor; memory coupled with the processor; and instructions stored in the memory and executable by the processor to cause the apparatus to perform the method of one or more of Aspects 26-46.

Aspect 53: A device for wireless communication, comprising a memory and one or more processors coupled to the memory, the one or more processors configured to perform the method of one or more of Aspects 26-46.

Aspect 54: An apparatus for wireless communication, comprising at least one means for performing the method of one or more of Aspects 26-46.

Aspect 55: A non-transitory computer-readable medium storing code for wireless communication, the code comprising instructions executable by a processor to perform the method of one or more of Aspects 26-46.

Aspect 56: A non-transitory computer-readable medium storing a set of instructions for wireless communication, the set of instructions comprising one or more instructions that, when executed by one or more processors of a device, cause the device to perform the method of one or more of Aspects 26-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive a slot configuration that indicates a component carrier comprising a plurality of virtual component carriers; and
      communicate based at least in part on the slot configuration.

2. The apparatus of claim 1, wherein the slot configuration indicates at least one additional component carrier comprising at least one additional plurality of virtual component carriers.

3. The apparatus of claim 1, wherein each virtual component carrier of the plurality of virtual component carriers is contained within a band associated with the component carrier.

4. The apparatus of claim 1, wherein the plurality of virtual component carriers comprises at least one pair of virtual component carriers that are contiguous in at least one of a time domain or a frequency domain.

5. The apparatus of claim 1, wherein the plurality of virtual component carriers comprises at least one pair of virtual component carriers that are non-contiguous in at least one of a time domain or a frequency domain.

6. The apparatus of claim 1, wherein the plurality of virtual component carriers comprises at least one pair of virtual component carriers that are at least partially overlapped in at least one of a time domain or a frequency domain.

7. The apparatus of claim 6, wherein the one or more processors, to communicate based at least in part on the slot configuration, are configured to perform full-duplex communication using the at least one pair of virtual component carriers.

8. The apparatus of claim 1, wherein the slot configuration indicates at least one full-duplex slot associated with at least one virtual component carrier of the plurality of virtual component carriers.

9. The apparatus of claim 1, wherein the slot configuration indicates at least one half-duplex slot associated with at least one virtual component carrier of the plurality of virtual component carriers.

10. The apparatus of claim 1, wherein the slot configuration indicates a portion of the component carrier that does not include a virtual component carrier.

11. The apparatus of claim 10, wherein the one or more processors, to communicate based at least in part on the slot configuration, are configured to communicate using a slot format of the component carrier for the portion of the component carrier that does not include a virtual component carrier.

12. The apparatus of claim 10, wherein communicating based at least in part on the slot configuration comprises communicating using a direction assignment for the portion of the component carrier that does not include a virtual component carrier, wherein the direction assignment comprises a flexible assignment, a reserved assignment, a downlink assignment, or an uplink assignment.

13. The apparatus of claim 1, wherein the plurality of virtual component carriers includes:
a first virtual component carrier that corresponds to downlink communications within a slot, and
a second virtual component carrier that corresponds to uplink communications within the slot.

14. The apparatus of claim 13, wherein the one or more processors are further configured to receive an indication that at least one of the first virtual component carrier or the second virtual component carrier is active.

15. The apparatus of claim 1, wherein the slot configuration indicates at least one virtual component carrier group that includes a set of the plurality of virtual component carriers.

16. The apparatus of claim 15, wherein the at least one virtual component carrier group corresponds to a communication direction.

17. The apparatus of claim 15, wherein the slot configuration indicates a time domain duplex slot configuration corresponding to the at least one virtual component carrier group.

18. The apparatus of claim 15, wherein the one or more processors, to receive the slot configuration, are configured to receive a radio resource control (RRC) message.

19. The apparatus of claim 18, wherein the one or more processors are further configured to receive an indication of at least one change associated with the at least one virtual component carrier group, wherein receiving the indication of the at least one change comprises receiving at least one of:
an additional RRC message,
a medium access control control element, or
a downlink control information transmission.

20. The apparatus of claim 1, wherein the slot configuration indicates at least one of a time domain duplex common slot configuration or a time domain duplex dedicated slot configuration associated with a set of active virtual component carriers of the plurality of virtual component carriers.

21. The apparatus of claim 1, wherein the slot configuration indicates at least two overlapped virtual component carriers having opposite direction assignments, wherein the UE is not capable of in-band full duplex communication, and wherein communicating based at least in part on the slot configuration comprises communicating using a slot format of the component carrier.

22. The apparatus of claim 1, wherein the slot configuration indicates at least one configured bandwidth part corresponding to at least one virtual component carrier of the plurality of virtual component carriers.

23. The apparatus of claim 1, wherein the slot configuration indicates at least one configured bandwidth part corresponding to at least one virtual component carrier group of the plurality of virtual component carriers.

24. The apparatus of claim 1, wherein the one or more processors are further configured to determine a bandwidth part (BWP) associated with a virtual component carrier of the plurality of virtual component carriers based at least in part on at least one of a frequency associated with the virtual component carrier or a BWP associated with the component carrier.

25. The apparatus of claim 1, wherein the one or more processors are further configured to determine, for a communication direction, a bandwidth part (BWP) associated with a virtual component carrier of the plurality of virtual component carriers based at least in part on an overlap between a BWP associated with the component carrier and a set of virtual component carriers of the plurality of virtual component carriers associated with the communication direction.

26. An apparatus for wireless communication at a base station, comprising:
a memory; and
one or more processors, coupled to the memory, configured to:
transmit a slot configuration that indicates a component carrier comprising a plurality of virtual component carriers; and
communicate based at least in part on the slot configuration.

27. The apparatus of claim 26, wherein the slot configuration indicates at least one virtual component carrier group that includes a set of the plurality of virtual component carriers.

28. The apparatus of claim 27, wherein the slot configuration indicates a time domain duplex slot configuration corresponding to the at least one virtual component carrier group.

29. A method of wireless communication performed by a user equipment (UE), comprising:
receiving a slot configuration that indicates a component carrier comprising a plurality of virtual component carriers; and
communicating based at least in part on the slot configuration.

30. A method of wireless communication performed by a base station, comprising:
transmitting a slot configuration that indicates a component carrier comprising a plurality of virtual component carriers; and
communicating based at least in part on the slot configuration.

* * * * *